United States Patent
Tsuchiya

(10) Patent No.: US 8,106,967 B2
(45) Date of Patent: Jan. 31, 2012

(54) IMAGE PICKUP DEVICE
(75) Inventor: Hitoshi Tsuchiya, Tokyo (JP)
(73) Assignee: Olympus Corporation, Tokyo (JP)
( * ) Notice: Subject to any disclaimer, the term of this patent is extended or adjusted under 35 U.S.C. 154(b) by 303 days.
(21) Appl. No.: 12/542,234
(22) Filed: Aug. 17, 2009
(65) Prior Publication Data
US 2010/0045815 A1 Feb. 25, 2010
(30) Foreign Application Priority Data Aug. 19, 2008 (JP) ................................. 2008-210565

(51) Int. Cl.
H04N 5/262 (2006.01)
(52) U.S. Cl. .............................. 348/239; 348/39; 348/37
(58) Field of Classification Search .................. 348/239, 348/36, 37, 38, 39
See application file for complete search history.

(56) References Cited

U.S. PATENT DOCUMENTS 7,456,864 B2 11/2008 Soga
2010/0271512 A1* 10/2010 Garten .......................... 348/239
2011/0141226 A1* 6/2011 Stec et al. ..................... 348/36
2011/0164108 A1* 7/2011 Bates et al. .................... 348/36

FOREIGN PATENT DOCUMENTS

JP 2005-311789 A 11/2005
* cited by examiner

Primary Examiner — Tuan Ho
(74) Attorney, Agent, or Firm — Westerman, Hattori, Daniels & Adrian, LLP

(57) ABSTRACT

In this image pickup device, a system controller uses pattern matching to detect regions where patterns match between images based on multiple sets of image data. Subsequently, the system controller conducts alignment based on the regions that are matched by pattern matching with respect to the multiple sets of image data that are generated by multiple imagings in a exposure time shorter than a normal exposure time while the imaging view field changes. Furthermore, the system controller adds the respective sets of image data after alignment, and generates image data corresponding to a view field that is wider than the imaging view field of a CCD. According to this image pickup device, motion blur can be reduced.

8 Claims, 7 Drawing Sheets

IMAGE PICKUP DEVICE

BACKGROUND OF THE INVENTION

1. Field of the Invention

The present invention relates to an image pickup device which generate a composite image by multiple shots, and which generates a panoramic image with a widened imaging view field.

Priority is claimed on Japanese Patent Application No. 2008-210565, filed Aug. 19, 2008, the content of which is incorporated herein by reference.

2. Background Art

In recent years, in conjunction with a trend toward increasing functional sophistication, a variety of functions have been loaded into digital cameras to appeal to users. Among these, a panoramic imaging function is one of the functions with high appeal, however, as its operation is complex and difficult, and as it also involves many cases of failure in photography, it cannot be said to be a function that is mastered by the great majority of users. By utilizing the panoramic imaging function, the user takes multiple shots while shifting the imaging view field, and after-mentioned overlap portions are stitched each other. As a result, a panoramic image corresponding to picked up image with a range wider than the range possible with ordinary picked up image can be obtained.

Here, the overlap portion will be explained. The overlap portion are end parts of the picked up images. Generating composite images is conducted by stitching the picked up images so that the mated end parts of the picked up images overlap. In this case, the stitching position can be determined by confirming whether or not the subject images of the overlap portions match.

However, as described below, the procedure of the panoramic imaging is very troublesome. First, it is necessary for the user to remember the subject image of the overlap portion at each time when a single shot is taken. Thereafter, if the imaging view field is, for example, shifted widthwise, the user must take care so that vertical positioning does not change. Furthermore, after the user has completed shifting the imaging view field, he/she judges whether or not the overlap portion matches the pre-shift imaging view field, and takes the shot if it matches. After shooting, the user remembers the next overlap portion, and repeats the above-described operations.

However, if the overlap portions from before and after the shifting of the imaging view field are shifted (if a vertical shift occurs when moving the imaging view field in the widthwise direction, and shooting), there is the problem that the imaging range in the direction that is not the direction of movement (the vertical direction in the case where the imaging view field is moved widthwise) is narrowed, because a rectangular region is extracted from the image that is finally obtained by stitching together all the images. Otherwise, in the case where the subject images of the overlap portions from before and after the shifting of the imaging view field do not match, there is the problem that one cannot paste them together, or that one forcibly stitching them together with the result that an unnatural image is obtained.

As a method of solving the aforementioned problems, in Japanese Unexamined Patent Application, First Publication No. 2005-311789, a digital camera is recorded which can obtain a panoramic image by simple operation. This digital camera detects the angles in the yaw direction and pitch direction of the camera body at the time of shooting of the panoramic image, causes a CCD image sensor to take multiple shots at photographic intervals based on angular velocity in the yaw direction, conducts generating composite image processing and alignment with respect to the multiple sets of image data based on the photographic intervals and angular velocity in the pitch direction, and generates the data of a single panoramic image.

SUMMARY OF THE INVENTION

The image pickup device of the present invention is provided with: an imaging member which images a subject, and which generates image data based on the subject image; a pattern matching member which uses pattern matching to detect regions where patterns match between images based on multiple sets of the image data; and a generating composite image member which conducts alignment based on the regions that are matched by the pattern matching with respect to multiple sets of the image data that are generated by multiple images in an exposure time shorter than a normal exposure time while the imaging view field changes, which adds the respective sets of the image data after alignment, and which generates image data corresponding to a view field that is wider than the imaging view field of the imaging member.

In the image pickup device of the present invention, it is preferable that the generating composite image member determine the number of sets of the image data to be used in adding data of the same region, based on the normal exposure time and exposure time at the time of imaging.

It is also preferable that the image pickup device of the present invention be further provided with an angular variation detection member which detects variation of the angle of a body of the image pickup device, and a timing determination member which determines timing of the imaging based on the aforementioned variation that is detected by the angular variation detection member.

It is also preferable that the image pickup device of the present invention be further provided with a notification member which notifies the user of imaging failure in the case where it is not possible to conduct imaging with the timing determined by the timing determination member.

It is also preferable that the image pickup device of the present invention be further provided with a detection member which detects brightness of the subject image, and an instruction member which provides the user with instructions concerning displacement of the imaging view field based on the brightness of the subject image that is detected by the detection member.

In the image pickup device of the present invention, it is also preferable that the pattern matching of the pattern matching member be conducted with respect to regions in which the spatial frequency of the image data is high, and which are near the center of the image that is based on the image data.

In the image pickup device of the present invention, it is also preferable that the generating composite image member conduct addition of said image data using data corresponding to regions that exclude the end parts of the image that is based on the image data.

It is also preferable that the image pickup device of the present invention be further provided with a temporary storage member which temporarily stores the image data that is subject to processing by the pattern matching member and the generating composite image member, and a control member which controls the gradation of the image data that is stored in the aforementioned temporary storage member according to the exposure time at the time of imaging.

PREFERRED EMBODIMENTS

Figure 1:
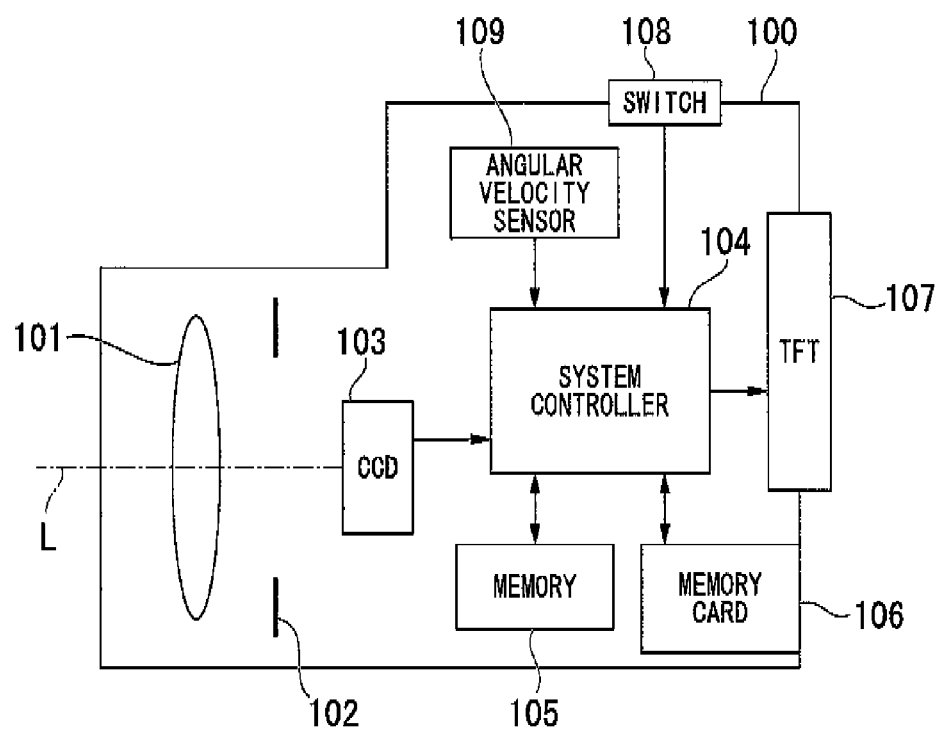
FIG. 1 is a block diagram which shows the configuration of a camera of one embodiment of the present invention.

Embodiments of the present invention are described below with reference to drawings. FIG. 1 shows the configuration of a camera (image pickup device) of one embodiment of the present invention. The camera shown in FIG. 1 is provided with an imaging optical system 101 within a camera body 100, aperture mechanism 102, CCD (Charged Coupled Device) 103, system controller 104, memory 105, memory card 106, TFT (Thin Film Transistor) 107, switch 108, and angular velocity sensor 109.

The imaging optical system 101 forms the subject image in the CCD 103 (corresponds to the imaging member). The aperture mechanism 102 regulates the amount of luminous flux from a subject by changing the diameter of an opening that is disposed perpendicular to an optical axis L. A subject image formed by the imaging optical system 101 is converted into electrical signals by the CCD 103, and is read out as video signals based on synchronous signals from the system controller 104 (corresponds to the imaging member). The video signals which are outputted from the CCD 103 undergo image processing to a certain extent within the system controller 104, after which they are recorded as image data in the memory 105. The system controller 104 is provided with various types of functions beginning with control of all components in the camera.

As an operating mode, this camera is provided with a panoramic imaging mode which conducts panoramic imaging. Furthermore, this camera does not have a shutter mechanism, and the photoelectric conversion time of the CCD 103 constitutes the exposure time without alteration. Exposure time is determined by the control of the system controller 104. In the panoramic imaging mode, apart from special cases, this camera sets the shutter speed at 1/1000 of a second, which corresponds to the shortest exposure time, and conducts repetitive imaging.

The image data generated by ordinary imaging is temporarily recorded in the memory 105. This image data is displayed in the TFT 107, and is recorded in the memory card 106. In the panoramic imaging mode, the system controller 104 reads out multiple sets of image data that were recorded in the memory 105 as a result of continuous imaging in the order of recording, generation composite image processing based on the respective sets of image data, and generates a panoramic image. The method of panoramic image generation is described below.

The TFT 107 displays video according to instructions from the system controller 104. The video displayed by the TFT 107 may consist of images that are shot, or it may consist of menus or information and the like pertaining to the operating mode of the system. The switch 108 is a release button and a switch for mode setting, and conveys the results of manipulation by the user to the system controller 104. The angular velocity sensor 109 (corresponds to the angular variation detection member) detects angular velocity, which is equivalent to the variation in the angle of the camera body 100, and informs the system controller 104 thereof. In the panoramic imaging mode, the system controller 104 determines imaging timing based on information concerning angular velocity that is outputted from the angular velocity sensor 109, and instructs the CCD 103 concerning the start of imaging (corresponds to the timing determination member).

Figure 2A:
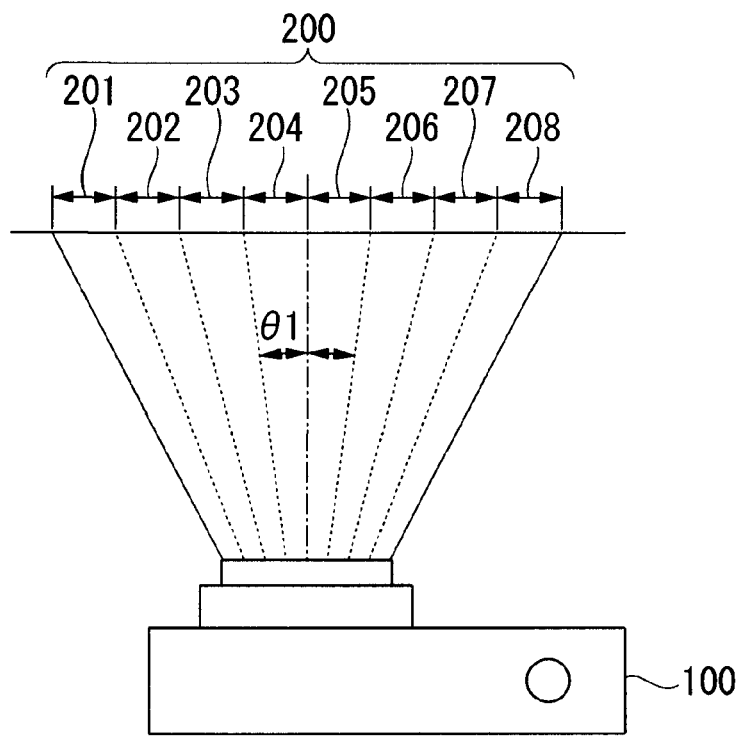
FIG. 2A is a reference drawing that serves to explain imaging timing in one embodiment of the present invention.

Next, imaging timing in the panoramic imaging mode is described. FIG. 2A shows a state where this camera is viewed from above. In FIG. 2A, an imaging region 200 corresponding to the imaging view field angle is uniformly divided into eight regions 201-208. The imaging view field angle can be computed from the size of the CCD 103 and focal distance, and θ1 which is 1/8 of that angle is the angle that constitutes the imaging interval.

Figure 2B:
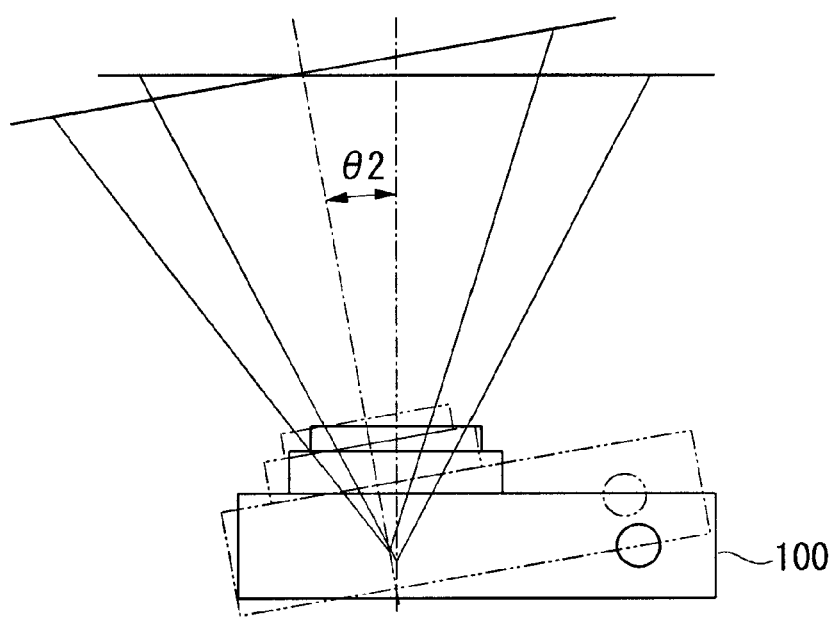
FIG. 2B is a reference drawing that serves to explain imaging timing in one embodiment of the present invention.

FIG. 2B supposes the case where the camera is horizontally swung, and shows a state where the camera is viewed from above. The system controller 104 determines the imaging timing based on information concerning angular velocity that is outputted from the angular velocity sensor 109. In the case where the angle at which the center line of the imaging optical system 101 is moved is considered θ2, the system controller 104 controls each component so that imaging is conducted with a timing where the angle θ1 shown in FIG. 2A matches the angle θ2 at which the center line of the imaging optical system 101 is moved from the previous imaging timing.

Figure 3:
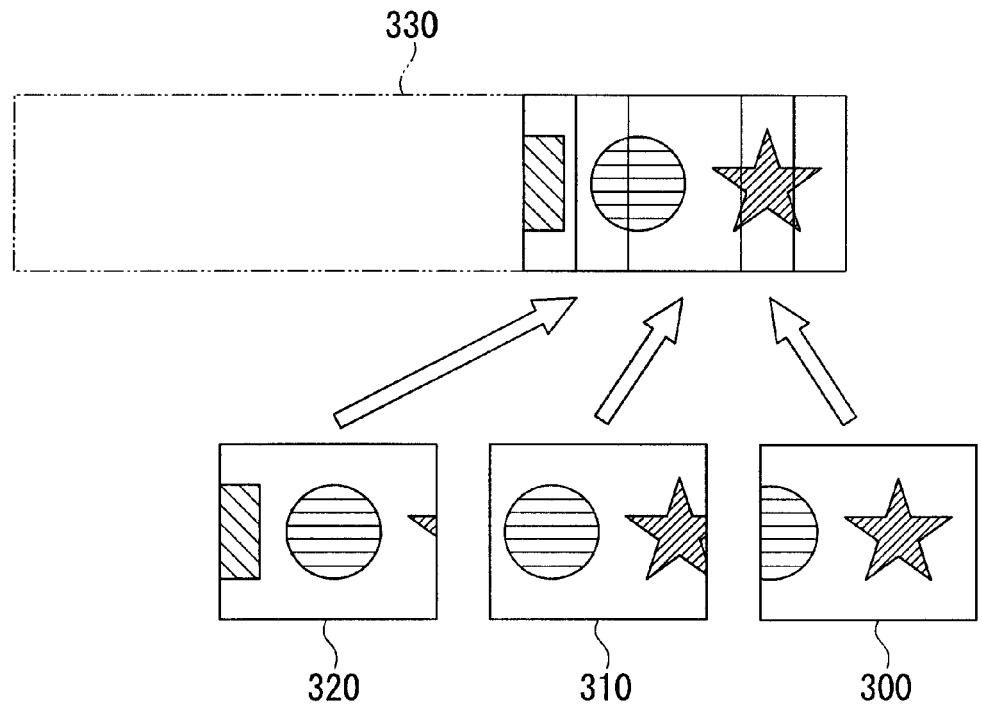
FIG. 3 is a reference drawing that serves to explain the generation method of a panoramic image in one embodiment of the present invention.

Next, a method of panoramic image generation in the panoramic imaging mode is described. FIG. 3 schematically shows the method of panoramic image generation. An image 300 is generated by an initial imaging. Subsequently, imaging is conducted with a timing where the variation in the angle of the camera body 100 from the time of initial imaging matches the angle θ1 shown in FIG. 2A, and an image 310 is generated. Imaging is further conducted with a timing where the variation in the angle of the camera body 100 from the time of the second imaging matches the angle θ1 shown in FIG. 2A, and an image 320 is generated. By repeating imaging as described above, other images (not illustrated in FIG. 3) are further generated.

In order to mitigate the effects of aberration on the end parts of images, the end parts of images are discarded in the present embodiment. With respect to the images 300, 310, and 320, images are shown in which the end parts have been discarded from the images corresponding to the imaging view field angle. The images 300, 310, and 320 are temporarily stored in the memory 105 by the system controller 104. Subsequently, panoramic image generation processing is conducted using these images.

In the memory 105, a region 330 for storage of panoramic image data is prepared in advance. Data of the region 330 prior to image storage is set to initial values (e.g., 0).

The system controller 104 generates a panoramic image by composite images in the following manner.

First, the system controller 104 conducts alignment of the image 300 with a prescribed partial region within the region 330 (in FIG. 3, a region including the right end of the region 330). As a result of this alignment, the position of the data of the image 300 corresponds with the data of the region 330. The system controller 104 updates the data of the region 330 by adding the value of each pixel of the image 300 to the data of the corresponding region 330 (initial values).

Next, the system controller 104 conducts pattern matching of the images 300 and 310 (corresponds to the pattern matching member), and aligns the image 310 based on the regions matched by pattern matching. Since the alignment of the image 300 with the region 330 has already been conducted as described above, alignment of the image 310 with the image 300 results in correspondence of the position of the data of the image 310 with the data of the region 330. The system controller 104 updates the data of the region 330 by adding the value of each pixel of the image 310 to the data of the corresponding region 330 (corresponds to generating composite image member).

After the system controller 104 has conducted alignment of the image 320 with the image 310, and made the position of the data of the image 320 correspond to the data of the region 330 in the same manner described above, the data of the region 330 is updated by adding the value of each pixel of the image 320 to the data of the corresponding region 330. By repeating the above processing with respect to multiple images that are generated by multiple shots taken while changing the imaging view field, a panoramic image which corresponds to a view field wider than the imaging view field is generated.

Figure 4:
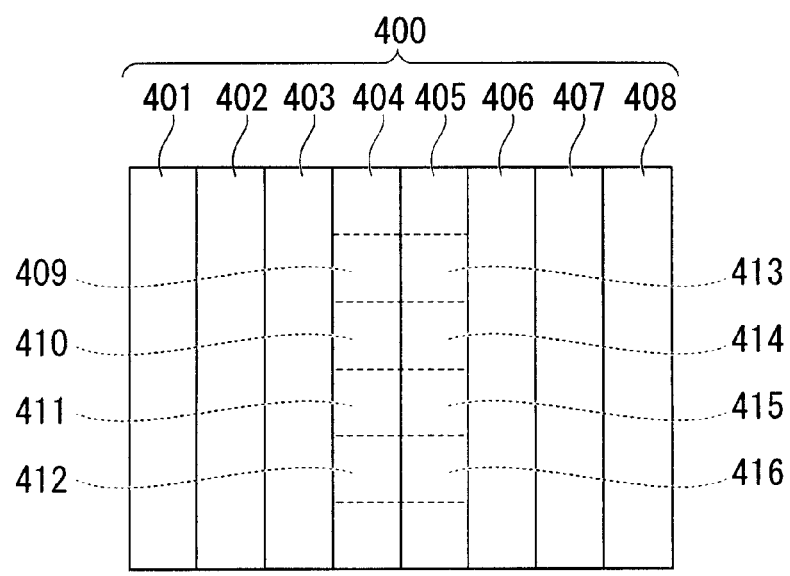
FIG. 4 is a reference drawing that serves to explain the generation method of a panoramic image in one embodiment of the present invention.

FIG. 4 shows the imaging view field of the shot images from which the aforementioned images 300, 310, and 320 originate. Vertically long regions 401-408 are regions which divide an imaging view field 400 into eight equal divisions, and correspond to the eight regions 201-208 shown in FIG. 2A. In the panoramic imaging mode of the present embodiment, the data sets of regions 401, 402, 407, and 408 are discarded in order to mitigate the effects of aberration in the end parts of the image. That is, when the image data is recorded in the memory 105, only the data sets of regions 403-406 are recorded in the memory 105.

In the panoramic imaging mode of the present embodiment, imaging is conducted with an exposure time shorter than a normal exposure time, and the image data of a panoramic image is generated by adding the multiple sets of image data that are generated. As imaging is thus conducted with the exposure time shorter than the normal exposure time, it is difficult for the subject within the motion blur. Furthermore, as multiple sets of image data are added, it is possible to obtain image data which is identical to that obtained when imaging is conducted with the normal exposure time. For example, when the shutter speed corresponding to normal exposure time is set at $1/250$ of a second, it is sufficient to conduct imaging at a shutter speed of $1/1000$ of a second, and to add the four sets of image data.

In order to obtain image data which is identical to that obtained when imaging is conducted with the normal exposure time, the system controller 104 controls the number of data additions by region of the image. In the case where the number of data additions of a certain region meets the prescribed number (4 times in the aforementioned case), the system controller 104 does not conduct any further additions of data with respect to that region. In the present embodiment, control of the number of additions is conducted in the units of the regions 401-408 shown in FIG. 4.

Regions 409-416 which are in the central part of the imaging region 400 shown in FIG. 4 are the regions which are used in pattern matching. When conducting pattern matching, the system controller 104 selects any one of the regions 409-416. At that time, regions which have low spatial frequency and low contrast, and regions which are saturated are excluded from selection.

In the panoramic imaging mode of the present embodiment, the system controller 104 controls the gradation of the image data that is stored in the memory 105 (corresponding to the temporary storage member) according to the exposure time at the time of imaging (corresponds to the control member). The video signals from the CCD 103 are composed by data of 10 bits per pixel. In the case where the shutter speed corresponding to the normal exposure time is $1/250$ of a second, and imaging is conducted at a shutter speed of $1/1000$ of a second, the brightness of the image is $1/4$ compared to when imaging is conducted with the normal exposure time. Consequently, there is no problem even if the upper 2 bits of the 10 bits are discarded. Accordingly, the system controller 104 records the image data of 10 bits per pixel in the memory 105 when ordinary imaging is conducted, and records the image data of 8 bits per pixel in the memory 105 when the panoramic imaging mode is operative.

In the panoramic imaging mode of the present embodiment, the number of additions of data per region has been set at 4 times, however, the number is not limited thereto, and the system controller 104 determines the number of additions of image data based on the normal exposure time and the exposure time at the time of imaging. For example, assuming that shutter speed at the time of imaging is fixed at $1/1000$ of a second, in the case where the normal exposure time is $1/200$ of a second, the system controller 104 sets the number of additions of image data at 5 times. In addition, in the case where the normal exposure time is $1/100$ of a second, the system controller 104 sets the number of additions of image data at 10 times.

Figure 5:
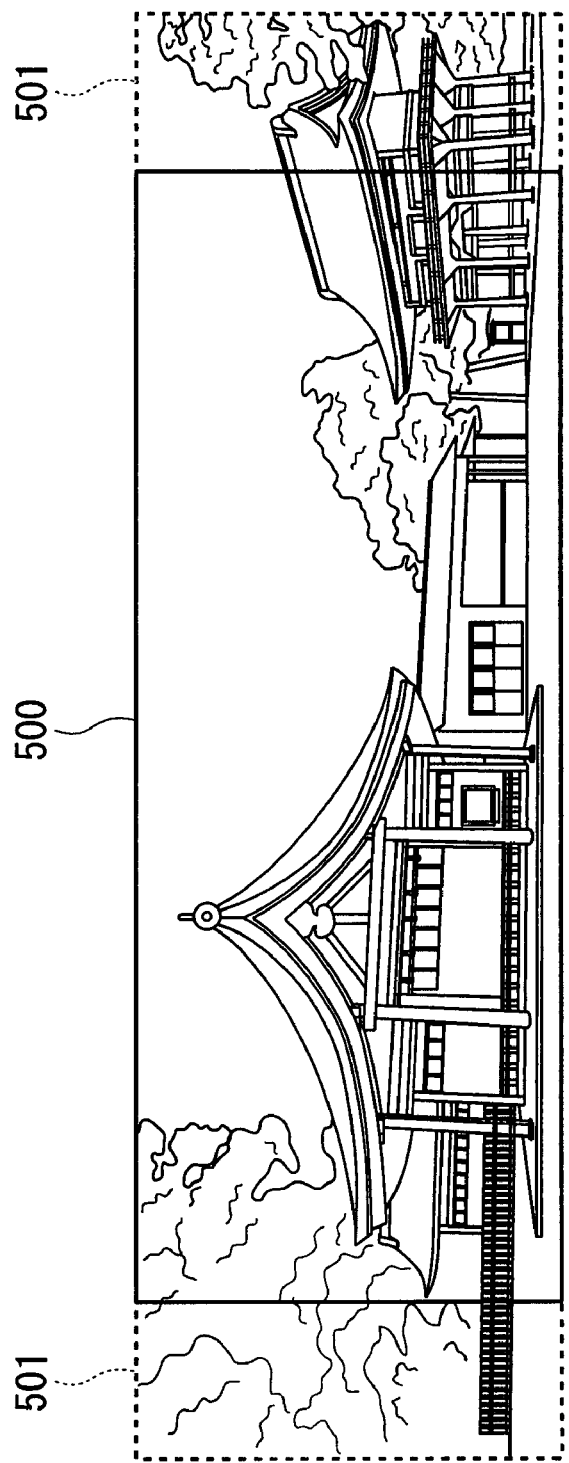
FIG. 5 is a reference drawing which shows a panoramic image in one embodiment of the present invention.
Figure 6:
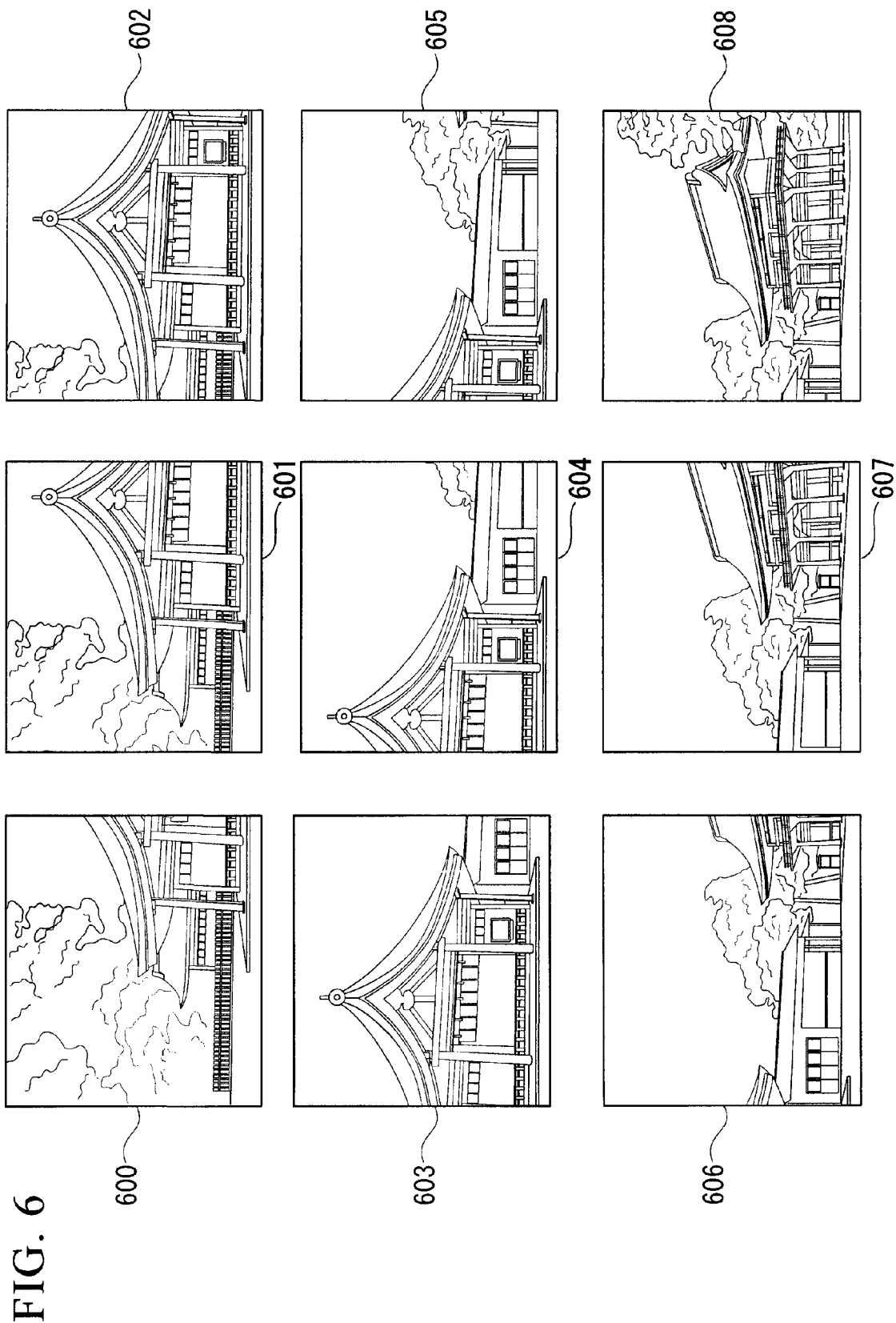
FIG. 6 is a reference drawing which shows images that are used in generation of a panoramic image in one embodiment of the present invention.

FIG. 5 is one example of a panoramic image that is generated by the aforementioned method. FIG. 6 shows the images that are used to generate a panoramic image 500 shown in FIG. 5. By composite images 600-608 that were shot with an exposure time that does not meet the normal exposure time, a panoramic image 500 corresponding to the normal exposure time is generated. Otherwise, regions 501 where the number of additions of data does not meet the prescribed number (4 times in the present embodiment) are excluded from panoramic imaging.

Figure 7:
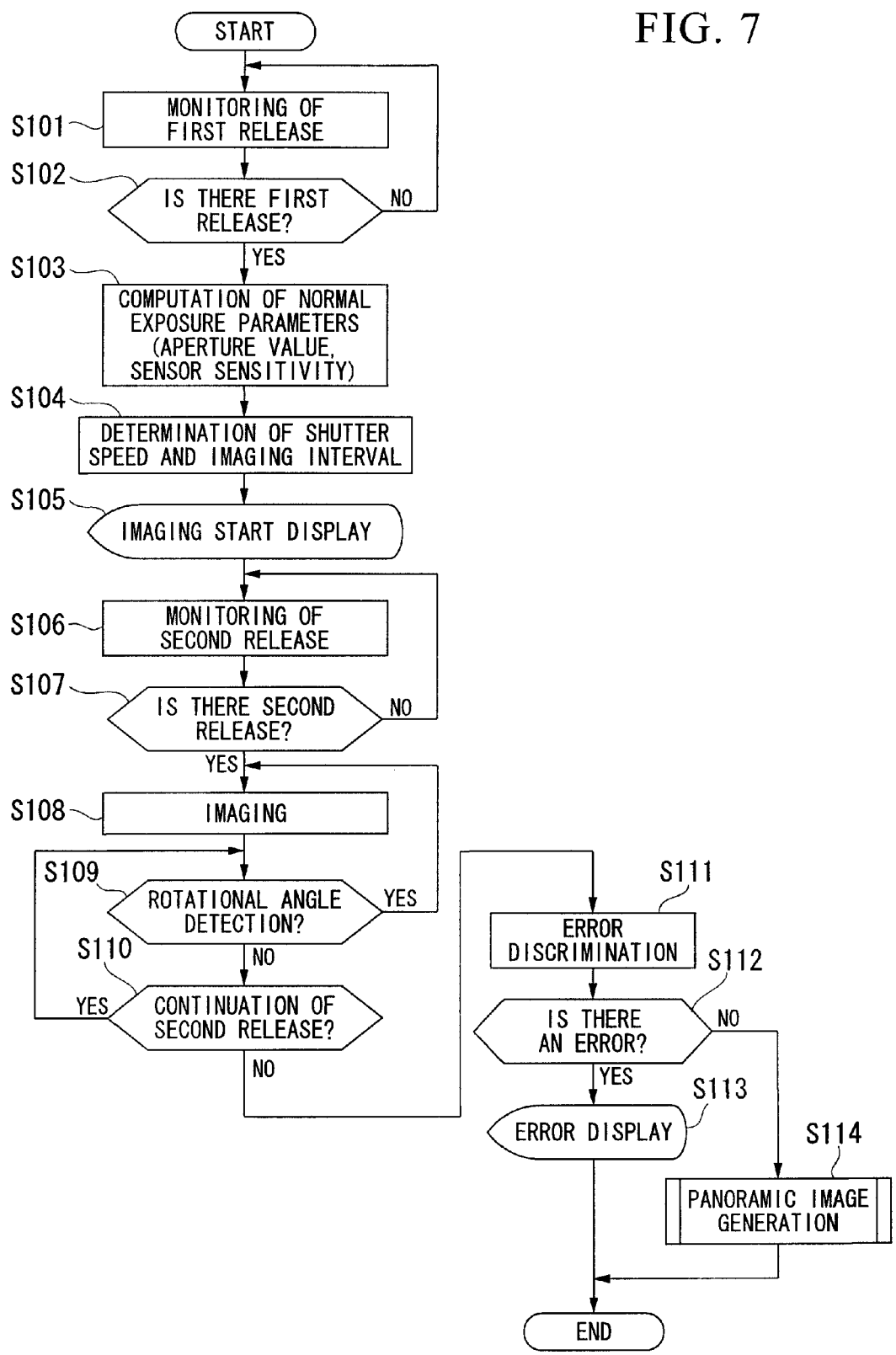
FIG. 7 is a flowchart which shows the generation sequence of a panoramic image in one embodiment of the present invention.

Next, the sequence of panoramic image generation in the panoramic imaging mode is described. FIG. 7 shows a sequence for panoramic image generation. When panoramic imaging is started, the system controller 104 monitors the operational results of the switch 108, and awaits a first release (step S101). First release is a condition wherein the release button is pressed halfway.

In the case where a first release is not detected (the case of NO in step S102), the system controller 104 returns to step S101, and again awaits first release. In the case where a first release is detected (the case of YES of step S102), the system controller 104 uses known techniques to compute the parameters (sensitivity of the CCD 103 and aperture value) corresponding to proper exposure (step S103). In the following description, parameters are computed wherein the shutter speed corresponding to normal exposure time is $1/250$ of a second.

Subsequently, the system controller 104 sets the shutter speed and the imaging interval (step S104). In the present embodiment, the shutter speed pertaining to an ordinary subject is fixed at $1/1000$ of a second, and the imaging interval is the angle θ1 shown in FIG. 2. In the case where a dark subject is imaged, it is possible to respond by increasing the number of divisions of the imaging region and increasing the number of shots and the number of additions. With respect to a dark subject, the slowing of shutter speed is also conceivable. In this case, in order to prevent motion blur and to lengthen exposure time, it would be possible to obtain the shutter speed from the relation of subject distance or focal distance and the acceptable circle of confusion, however, as calculations are complex, the shutter speed is fixed at the quickest speed in the present embodiment.

When the normal exposure time and the shutter speed are determined, the number of additions of image data is determined as described above. In the panoramic imaging mode of the present embodiment, the number of additions is 4 times. As it is necessary to change the number of divisions of the imaging view field according to the number of additions, it is also acceptable to re-calculate the angle $\theta 1$ that is equivalent to the imaging interval as appropriate.

When the settings pertaining to the each imaging are determined, the system controller 104 displays a message that urges initiation of imaging in the TFT 107 (step S105). At this time, in the case where the subject is dark and the number of divisions of imaging is changed, the system controller 104 displays a message (instruction concerning displacement of the imaging view field) in the TFT 107 which urges care so that the imaging view field is slowly moved (corresponds to the instruction member). The system controller 104 detects the brightness of the subject based on the video signals outputted from the CCD 103 (corresponds to the detection member).

Subsequently, the system controller 104 monitors the operational results of the switch 108, and awaits a second release (step S106). A second release is a condition wherein the release button is fully pushed in. In the case where a second release is not detected (the case of NO in step S107), the system controller 104 returns to step S1106, and again awaits second release. In the case where second release is detected (the case of YES in step S107), the system controller 104 controls each component in the camera, and conducts imaging (step S108). The image data that is generated by imaging is stored in the memory 105 after the data of the end parts of the images are discarded as described above.

After the start of imaging, the system controller 104 conducts imaging whenever the rotational movement amount of the camera body 100 becomes $\theta 1$ (in the case of YES in step S109) (step S108). So long as the second release is not cleared (the case of NO in step S019, and YES in step S110), the system controller 104 conducts discrimination of the rotational movement amount (step S109).

In the case where the second release is cleared (the case of NO in step S109 and NO in step S110), the system controller 104 conducts error discrimination (step S111). With respect to errors in this instance, there are two cases: the case where imaging could not be conducted whenever the rotational movement amount $\theta 1$ was detected; and the case where a sufficient number of images could not be secured for generation of a panoramic image. An error in the former case is due to excessive movement speed of the camera, and an error in the latter case is due to a failure to sufficiently swing the camera.

In the case where the time required for the angle of the camera body 100 to change proportionate to $\theta 1$ is shorter than the imaging interval of the camera determined according to the exposure time and the read-out time of the signals, the system controller 104 discriminates that an error has occurred due to excessive movement speed of the camera. In the case where the total rotational movement amount of the camera from the time of imaging commencement does not meet a prescribed value, the system controller 104 discriminates that an error has occurred due to a failure to sufficiently swing the camera.

In the case where one of the aforementioned errors has occurred (the case of YES in step S112), the system controller 104 displays a message corresponding to the respective error in the TFT 107 (step S113) (corresponds to the notification member). In the case where an error has not occurred, the system controller 104 performs panoramic image generation which generates a panoramic image (step S114).

Figure 8:
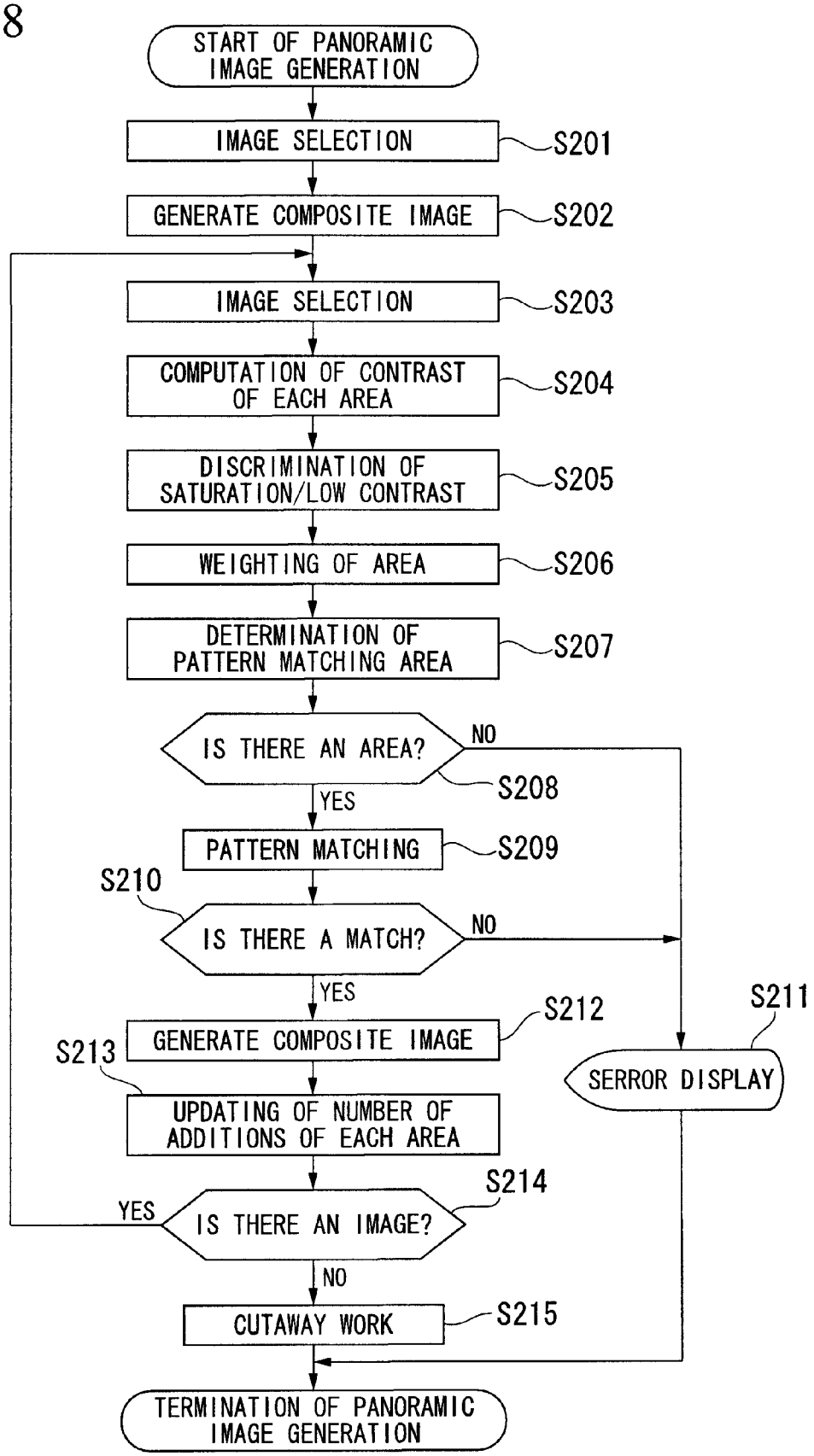
FIG. 8 is a flowchart which shows the generation sequence of a panoramic image in one embodiment of the present invention.

FIG. 8 shows the detailed procedure for the panoramic image generation of step S114. In panoramic image generation, the image data recorded in the memory 105 is read out in the order that imaging occurred, and a panoramic image is generated by the respective sets of image data. First, the system controller 104 selects one set of image data that was produced by the initial imaging (step S201), and generate composite image (step S202). In this generation, as described above, the selected image data is added to the initial values stored in the region for panoramic image use of the memory 105.

Subsequently, the system controller 104 selects the image data that was produced by the next imaging (step S203), conducts bypass filter processing in the eight regions 401-408 shown in FIG. 4, and obtains the contrast for each region used in pattern matching with respect to the data after filtering (step S204). Furthermore, the system controller 104 discriminates by region whether or not contrast exceeds a prescribed threshold value from the results of contrast computation, and whether or not the pixel data exceeds prescribed threshold values (step S205).

In the case where contrast is insufficient, the system controller 104 excludes the region(s) for which that contrast was computed from pattern matching, because of the effects it would have on the accuracy of pattern matching. In the present embodiment, as the image data stored in the memory 105 is 8-bit image data, the condition of confirmation of step S205 is the existence of contrast of 128 or higher in the data after bypass filter processing.

With respect to the saturation of the regions, the condition of confirmation of step S205 is that pixel values do not exceed 250 prior to bypass filter processing. In the case of a subject with high luminance, due to the effects exercised on the accuracy of pattern matching, regions where pixel values do not exceed 250 are treated as regions that are subject to pattern matching. Moreover, apart from the aforementioned error confirmation, accuracy is further raised when a check is conducted with respect to recurrent patterns. Recurrent patterns are patterns such as striped patterns, and are the cause of detection errors.

In the case where there are multiple error-free regions according to the above, the system controller 104 applies a weighting factor corresponding to the position of the region to the contrast value of the respective region (step S206), and selects the region in which that value is highest for pattern matching (step S207). As for this weighting factor, the value becomes higher as the center of the imaging region is approached. Accordingly, regions which are close to the center of the imaging region and which have a high contrast value tend to be selected as the regions for pattern matching.

In the case where there are no regions which match the aforementioned conditions (the case of NO in step S208), the system controller 104 conducts error display in the TFT 107 (step S211), and terminates panoramic image generation. In the case where it was possible to select a region for pattern matching (the case of YES in step S208), the system controller 104 conducts pattern matching of the selected region and the generated composite image that is stored in the memory 105 (step S209). At this time, the time required for matching can be shortened by referencing the history of angular velocity detected by the angular velocity sensor 109, and by computing in advance which part of the generated composite image corresponds to the region for pattern matching.

In the case where it was not possible to discover a matching region (the case of NO in step S210), the system controller 104 causes error display in the TFT 107 (step S211), and terminates panoramic image generation. In the case where there was a matching region (the case of YES in step S210), the system controller 104 generate composite image according to the above-described method (step S212).

After the generation of the composite image, the system controller 104 updates the number of additions recorded in the memory 105 per each of the eight regions 401-408 of FIG. 4. That is, the system controller 104 increases the number of additions by 1 with respect to a region that has undergone addition, however, does not update the number of additions with respect to regions that do not undergo addition (step S213). Moreover, in the case where this addition value reaches the prescribed number (4 times in the present embodiment), addition is not conducted when there is subsequent generate composite image even if there is data of a corresponding region.

In the case where image data to be generated remains in the memory 105 (the case of YES in step S214), processing returns to step S203. In the case where no image data to be generated composite image remains in the memory 105 (the case of NO in step S214), the system controller 104 conducts cutaway work with respect to the panoramic image data (step S215). The cutaway work is processing which fashions the angle of field into a rectangle (step S215). Specifically, the system controller 104 excises parts which jut outward due to vertical misalignment between the respective images, and parts where the number of additions of images does not meet the prescribed number (the two end parts of the panoramic image). When the cutaway work pertaining to the panoramic image data terminates, panoramic image generation processing terminates.

According to the present embodiment as described above, it is possible to mitigate motion blur by generating the data of the panoramic image that corresponds to the view field wider than the imaging view field of the camera, using multiple sets of image data generated by imaging conducted with the exposure time shorter than the normal exposure time. In addition, imaging can be simply conducted with a sense of panning shot.

It is also possible to obtain a panoramic image identical to that obtained when conducting imaging with the normal exposure time by determining the number of sets of image data (number of additions) to be used in addition of data of the same region based on the normal exposure time and exposure time at the time of imaging.

By determining the imaging timing based on variation of the angle of the camera body 100, it is also possible to eliminate needless imaging and the waste of images, mitigate the risk of imaging failure, and curtail the data volume of the images.

In the case where imaging cannot be conducted at the determined timing, it is also possible to prompt the user redo imaging by notifying the user of the imaging failure.

Based on the brightness of the subject image detected from the image, it is also possible to mitigate the risk of imaging failure by instructing the user with respect to displacement of the imaging view field. For example, in the case where the subject is dark, it is possible to prevent the failure of imaging by having the TFT 107 display a message that urges the user to move the camera slowly.

It is also possible to improve the accuracy of pattern matching by treating regions which have a high spatial frequency and which are near the center of the image as the subjects of pattern matching. Furthermore, as pattern matching is conducted with a portion of the regions of the image, it is possible to reduce circuit size and shorten detection time.

As portions which have a large optical aberration are not used in addition of image data, because data corresponding to regions which exclude the end parts of the image is used in addition of image data, it is also possible to mitigate the sense of discomfort due to aberrations produced in the portions whose data is added. Furthermore, the data volume of the image can be reduced, and the number of recordable frames can be increased, with the result that a panoramic image of wider range can be produced.

It is also possible to reduce the data volume of images by controlling the gradation of the image data that is stored in the memory 105 according to the exposure time at the time of imaging, with the result that a panoramic image with a wider range can be generated as described above.

That is, according to the present invention, the effect is obtained that it is possible to generate image data which corresponds to the view field wider than the imaging view field which mitigates motion blur by using multiple sets of image data generated by imaging with the exposure time shorter than the normal exposure time.

While a preferred embodiment of the present invention has been described with reference to drawings, the specific configuration of the present invention is not limited by the aforementioned embodiment, and also includes design modifications and the like that do not depart from the spirit or scope of the present invention. For example, if the parameters relating to exposure were determined for each imaging, it would also be possible to accommodate subjects that have large variations in luminosity. In addition, the imaging view field was divided into 8 parts, and exposure time at the time of imaging was set to ¼ of the normal exposure time, however, these items are not limited thereto. Moreover, shutter speed at the time of imaging was fixed at $1/1000$ of a second, however it may also be set lower within a range in which the motion blur does not occur, or shutter speed may be set faster to increase the number of generated composite images.

What is claimed is:

1. An image pickup device, comprising:
an imaging member which images a subject, and which generates image data based on the subject image;
a pattern matching member which uses pattern matching to detect regions where patterns match between images based on multiple sets of said image data; and
a generating composite image member which conducts alignment based on the regions that are matched by said pattern matching with respect to multiple sets of said image data that are generated by multiple imagings in an exposure time shorter than a normal exposure time while the imaging view field changes, which adds the respective sets of said image data after alignment, and which generates image data corresponding to a view field that is wider than the imaging view field of said imaging member.

2. The image pickup device according to claim 1, wherein said generating composite image member determines the number of sets of said image data to be used in adding data of the same region, based on said normal exposure time and exposure time at the time of imaging.

3. The image pickup device according to claim 1, further comprising:
an angular variation detection member which detects variation of an angle of a body of the image pickup device; and
a timing determination member which determines timing of the imaging based on said variation that is detected by said angular variation detection member.

4. The image pickup device according to claim 3, further comprising: a notification member which notifies the user of imaging failure in the case where it is not possible to conduct imaging with the timing determined by said timing determination member.

5. The image pickup device according to claim 1, further comprising:
a detection member which detects brightness of said subject image;
and an instruction member which provides the user with instructions concerning displacement of said imaging view field based on the brightness of said subject image that is detected by said detection member.

6. The image pickup device according to claim 1, wherein said pattern matching of said pattern matching member is conducted with respect to regions in which the spatial frequency of said image data is high, and which are near the center of the image that is based on said image data.

7. The image pickup device according to claim 1, wherein said generating composite image member conducts addition of said image data using data corresponding to regions that exclude the end parts of the image that is based on said image data.

8. The image pickup device according to claim 1, further comprising:
a temporary storage member which temporarily stores said image data that is subject to processing by said pattern matching member and said generating composite image member;
and a control member which controls the gradation of said image data that is stored in said temporary storage member according to the exposure time at the time of imaging.

* * * * *